July 4, 1939.  A. KUEHN  2,164,413

SPRING WHEEL MOUNTING FOR AUTOMOTIVE VEHICLES

Filed Aug. 13, 1936   3 Sheets-Sheet 1

INVENTOR
Alfred Kuehn
BY
Wheeler, Wheeler & Wheeler
ATTORNEYS

July 4, 1939.   A. KUEHN   2,164,413
SPRING WHEEL MOUNTING FOR AUTOMOTIVE VEHICLES
Filed Aug. 13, 1936   3 Sheets-Sheet 2
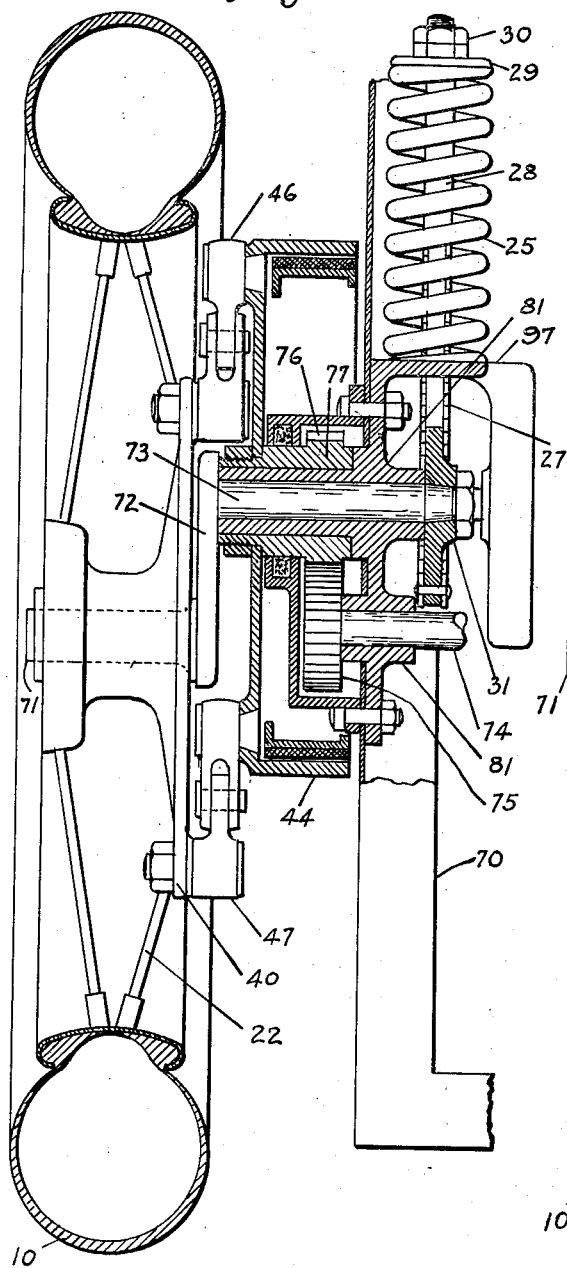
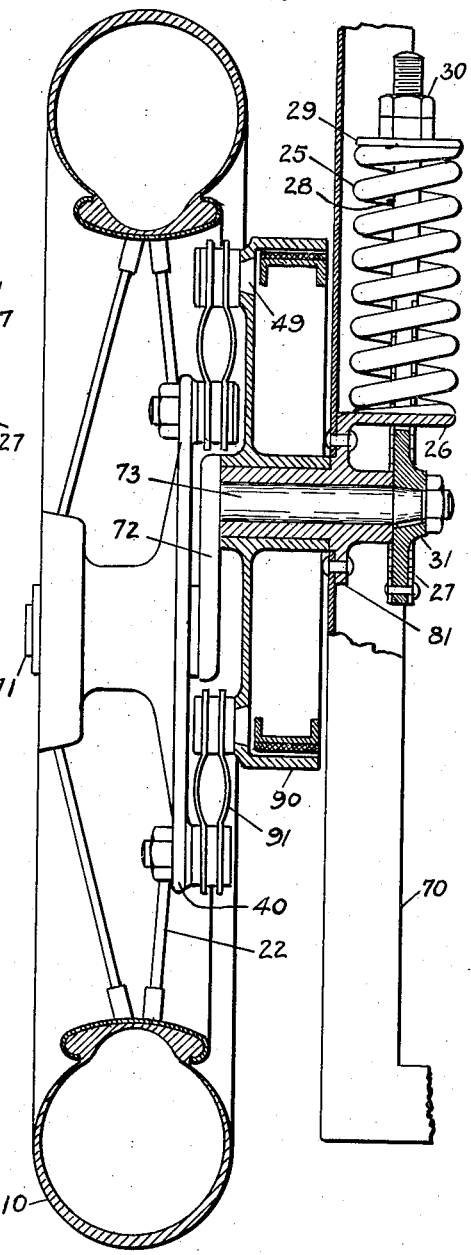
INVENTOR
Alfred Kuehn
BY
Wheeler, Wheeler & Wheeler
ATTORNEY July 4, 1939.  A. KUEHN  2,164,413
SPRING WHEEL MOUNTING FOR AUTOMOTIVE VEHICLES
Filed Aug. 13, 1936  3 Sheets-Sheet 3
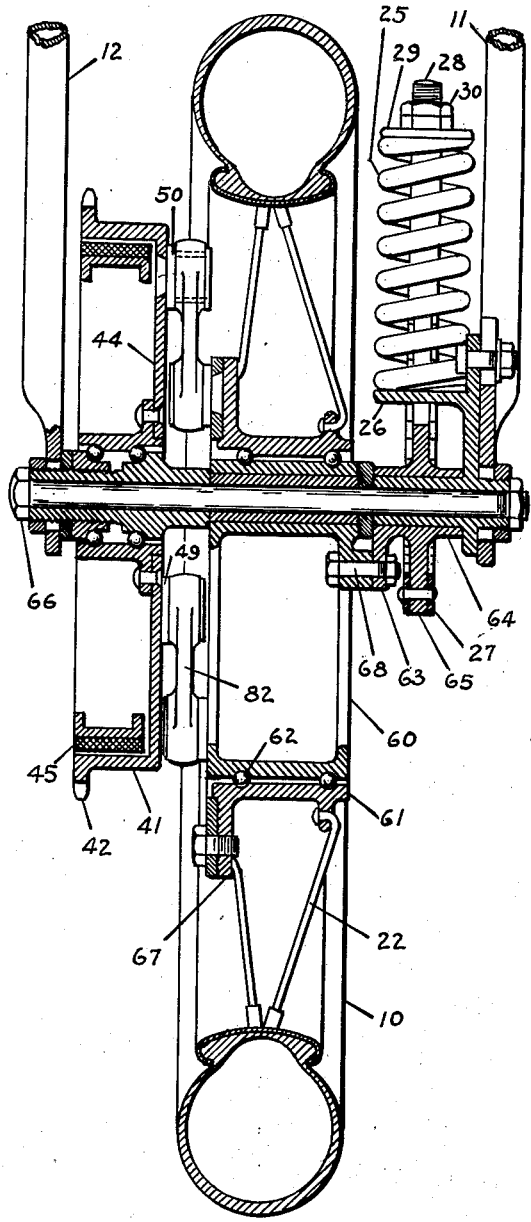
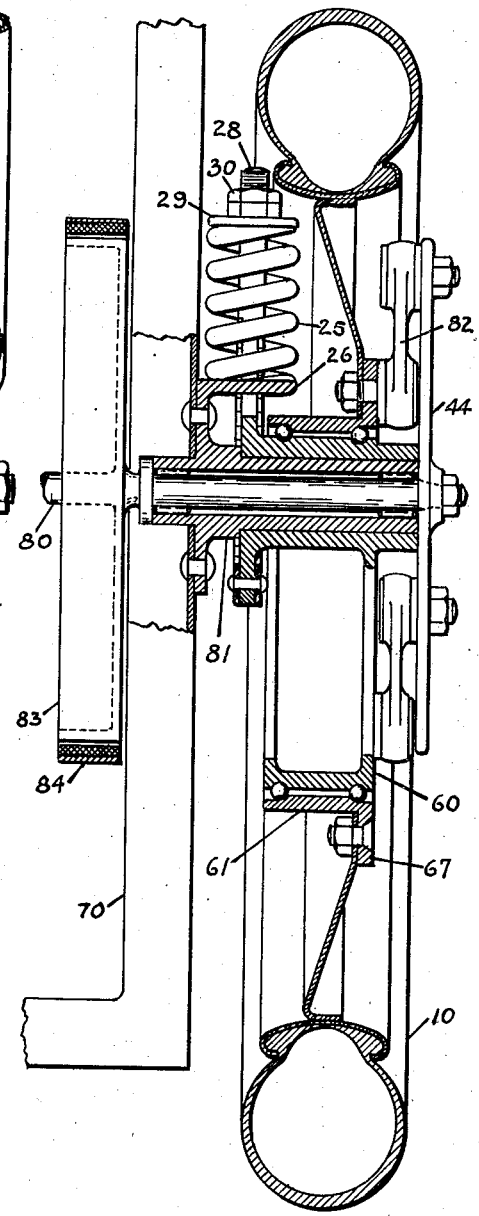
INVENTOR
Alfred Kuehn
BY
Wheela, Wheeler & Wheela
ATTORNEY Patented July 4, 1939

2,164,413

UNITED STATES PATENT OFFICE 2,164,413

SPRING WHEEL MOUNTING FOR AUTOMOTIVE VEHICLES

Alfred Kuehn, Wauwatosa, Wis.

Application August 13, 1936, Serial No. 95,725
In Germany August 14, 1935

2 Claims. (Cl. 180—30)

The object of my invention is to provide a spring wheel mounting for automotive vehicles and new driving connections to wheels so mounted.

This invention consists of the mounting of spring wheels on vehicles such as automobiles, motorcycles, motor trucks, etc. It may also be used on airplanes, bicycles, etc. Its main object is to hold the unsprung weight of a vehicle as low as possible.

I have shown several alternative ways of suspending the wheels on the vehicle. In the first case the wheel is mounted on a single or double crank, as per Figs. 1, 2, 3, 4, and 5. In the second case the wheel is mounted on a hollow shaft, as per Figs. 6 and 7. In either case the axis around which the wheels turn is eccentrically mounted on a shaft or stud (solid or hollow), and there is a spring arrangement provided between the eccentrically mounted shaft and the frame of the vehicle so that the wheels can swing around the eccentrically mounted wheel or shaft and change their position in regard to the rest of the vehicle by overcoming the spring tension, so that the swinging mass is practically reduced to the wheels only.

In the drawings:

Figure 4 is a view of an alternative construction comparable to that shown in Fig. 2, but with especially designed parts for gear rather than chain drive.

Figure 5 is a view similar to Fig. 2, but showing an alternative form of linkage in the articulated driving connections.

Figure 6 is a view similar to Fig. 2, but showing a wheel bearing of alternative design for use with my spring mounting and rigid driving connections.

Figure 7 shows a structure comparable to that set forth in Fig. 5, but with an alternative wheel and brake mounting designed for shaft driven rather than chain driven wheels.

Like parts are designated by the same reference characters throughout the several views.

Figure 1:
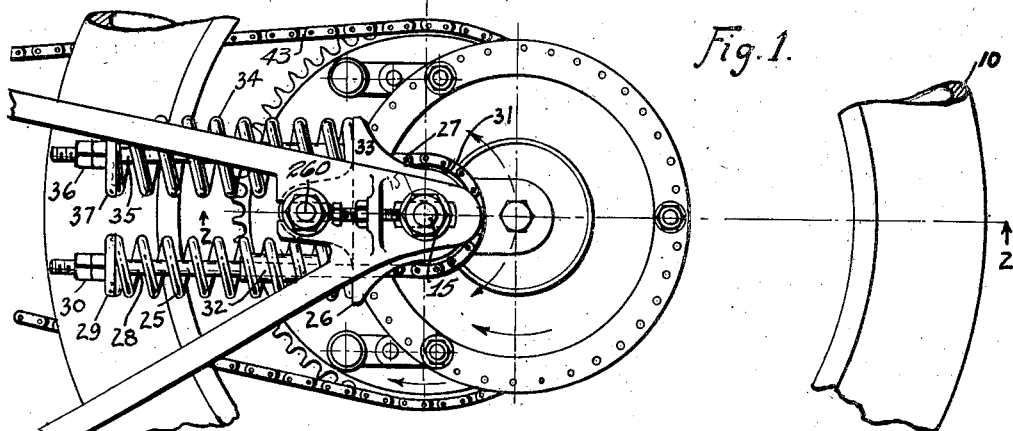
Figure 1 is a side elevation of a wheel mounting for the rear wheel of a motorcycle, a portion of the frame and a portion of the tire and rim of the rear wheel being shown.

As installed in a motorcycle as illlustrated in Figs. 1, 2, 3, and 6, the wheel 10 to which power is applied is mounted between the members 11 and 12 comprising what is commonly termed a rear fork of the motorcycle frame. The rearwardly extended terminal portions 13 and 14 of the members 11 and 12, respectively, are equipped to receive and rigidly hold studs 15 and 16 which comprise mounting posts for a crank-like structure including collars 17 and 18, and crank arms 19 and 20.

An axle pin 21 connects the crank arms 19 and 20, and by reason of the threaded connection of the pin with the crank arm 20 tends to draw the crank arms together. A tubular sleeve 210 placed between the crank arms and concentric with the pin determines the spacing of the crank arms and comprises the actual axle for the wheel 10 with its spokes 22 and hub 23, the usual anti-friction bearings 24 being provided for the mounting of the hub 23 upon the bearing sleeve 210.

With the structure thus far described, there is nothing to prevent the crank arms 19 and 20 assuming a vertical position when a load is placed upon the frame fork 11, 12, and it is with one portion of my invention, to-wit, the spring suspension, that the control of the spring movement of these crank arms 19 and 20 is concerned, as follows:

Spring suspension

Since the spring controlled movement of the crank arms 19 and 20 ranges between maximum upper and lower positions of the crank arms, I have so devised my new spring structure that when the vehicle equipped with my invention is heavily loaded, the crank arms are approximately horizontal, as shown in the drawings, and the weight load is supported in this position of the parts by spring 25 which is seated upon a spring saddle 26 against which it is compressed by the action of a chain 27 and chain post 28 provided with a cap washer 29 and adjusting nuts 30. The spring saddle 26 and the spring saddle 33 hereinafter referred to form a unit which is rigidly mounted on the face of the fork 12 and stud 15 and stud 260 prevent the rotation thereof as indicated in Figure 1. The chain 27 extends over a sprocket 31 securely mounted upon collar 17 which moves integrally with the crank arm 19. The chain post 28 which is secured to the chain 27 is guided by a tubular guide member 32 which is formed as a part of the spring saddle 26.

The spring saddle 26 is shaped not only to receive the abutment of the weight controlling spring 25, but is also provided at 33 with a seat for recoil spring 34 which likewise has a chain post 35 and adjusting nuts 36 with cap washer 37. Chain post 35 is secured to the end of chain 27 opposite the end to which the chain post 28 is secured. With this structure the chain 27 upon its sprocket 31 controls recoil following the spring action of weight controlling spring 25.

Since the sprocket 31 is concentric with the stud 15, and the axis of the wheel 10 is in crank relation to the stud 15, any load upon the frame and fork will tend to cause the sprocket 31 to rotate in a counter-clockwise direction as seen in Figure 1. Since the chain 27 upon the sprocket 31 is restrained by the compression springs 25 and 34, any tendency of the load to rotate the sprocket 31 in a counter-clockwise direction is resisted by spring 25, and when the load is relieved spring 34 tends to check the recoil.

With the structure thus far disclosed, it is apparent that I have provided a spring suspension for a vehicle wheel wherein the wheel itself is mounted from the frame for crank-like motion and such crank-like motion is controlled by springs which operate horizontally and it will be noted from the above description that with a normal load, less than maximum, the crank arms 19, 20 will normally extend downwardly and backwardly from the axle pin 15, 16, thus tending to "ease" the load over obstructions in the road.

Power application

The transmission of power to a wheel 10 mounted upon an axle to be moved in a crank-like motion under the resilient control of springs would ordinarily present serious problems, but I have provided in the construction now to be described, means whereby power may be applied to the wheel 10 under these circumstances, and at the same time to facilitate the ready removal of the wheel 10 from its mounting for repair of a tire or for any other repair operations which would be facilitated by the removal of the wheel from its position between the fork members 11, 12.

I mount upon the wheel hub 23 a driven disc 40. I mount upon collar 18 a drum-like member 41 which comprises in the one element a sprocket with teeth 42 to receive a driving chain 43, a driving plate 44, and means against which an expanding brake band 45 may be adjusted to accomplish a braking action.

Between the driving plate 44 and the driven disc 40, I provide articulated linkage 46, 47, 48, each of the articulated linkage members being composed of two elements with fork connections. Theoretically, I could provide each of the linkage elements 46, 47, 48 in the form of straight, rigid connecting rods. However, since absolute accuracy of machining and identical construction of parts is commercially impossible because of high cost, I have found that articulated links are acceptable mechanically and accomplish my purpose which is the transmittal of power from the plate 44 to the plate 40 and its wheel 10.

The articulated links 46, 47 and 48, when in tension, extend between centers represented by pins 49 and 50, which are separated a distance substantially identical with the distance between the pins 15—16 and axle pin 21. It is thus possible to have the links 46, 47 and 48 "swing" in the same plane, and by articulating the links 46, 47 and 48 I allow for any mechanical irregularity in their construction or in any looseness of the bearings and as indicated in dotted lines in Figure 3, the links are sufficiently flexible to accommodate any crank movement of the wheel axis since the springs 25 and 34 alternatively yield for load or recoil, respectively.

It will be understood, of course, that the plate 44 and its integral hub are mounted for free rotation upon collar 18 and suitable bearing surfaces therebetween may be provided.

In the construction shown in Fig. 6, the eccentricity of mounting of the wheel 10 is carried out in an enlarged axle collar 60 upon which a large wheel hub 61 is mounted with proper anti-friction bearings 62. The axle hub is rigidly secured to a crank support 63 by means of a bolt 68. The crank 63 is formed integrally with a sprocket collar 64 which is integral with sprocket 65 upon which the spring chain 27 operates in much the same manner that the spring chain 27 heretofore described operates in the structure shown in Figs. 1 and 2.

In this construction a single axle pin 66 extends between the fork members 11 and 12, and the driven member in this construction may comprise merely a flange 67 forming part of the wheel hub 61, the flange 67 forming the point of attachment for the pins upon which the driving links are mounted.

Gear and shaft drives

In Figs. 4 and 7, I have shown an axle mounting spring suspension and driving connections for a wheel forming part of a vehicle having a frame 70. In Fig. 4 the drive to the wheel is through a shaft and gearing and in Fig. 7 the drive to the wheel is through a shaft.

In Fig. 4, the wheel 10 is mounted upon an axle 71 formed as a part of a crank construction including a radial element 72 and a main shaft 73. The main shaft is provided with chain sprocket 31, spring chain 27, and the type of spring construction heretofore described.

The driving connections include a driven plate 40 and a driving disc 44 as heretofore described, with their connecting articulated links 46, but the power to the driving disc 44 is received from a shaft 74, and a pinion 75 thereon, meshed with a gear 76 mounted for rotation with the hub 77 upon which the driving disc 44 is mounted, thus carrying the power connections through to the wheel as will be readily understood from the previous description.

In Figure 7 I have shown a wheel 10 mounted upon an axle collar 60 as described with respect to Fig. 6 and power connections are transmitted to the wheel 10 by means of a shaft 80 extending through a fixed hub 81 to the driving disc 44. Driving disc 44 rotates positively with the shaft 80 and is provided with linkage 82. Preferably the brake drum 83 and brake bar 84 acting thereon are placed as shown in Fig. 7 somewhat spaced from the wheel mounting. It will be noted that by constructing the wheel mounting as shown in Fig. 7, a straight shaft drive is possible whereas with the crank as illustrated in Fig. 4, the drive necessitates the gear transmission as there illustrated.

In the construction shown in Fig. 5, I have shown a spring mounting and a crank support for the wheel comparable to that shown in Fig. 4, but I have shown no power driving connections. I have shown a brake drum 90 which in this instance is driven by the wheel itself through driving links 91 which are flexible and can adjust themselves to required lengths automatically without toggle or complicated linkage.

Shock absorbers

Figure 2:
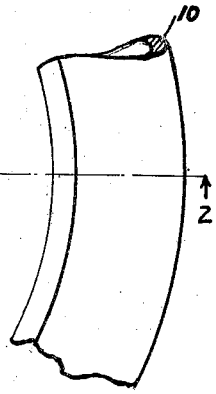
Figure 2 is a section on line 2—2 of Fig. 1 and showing the spokes of the wheel and omitting the drive chain therefrom.
Figure 2:
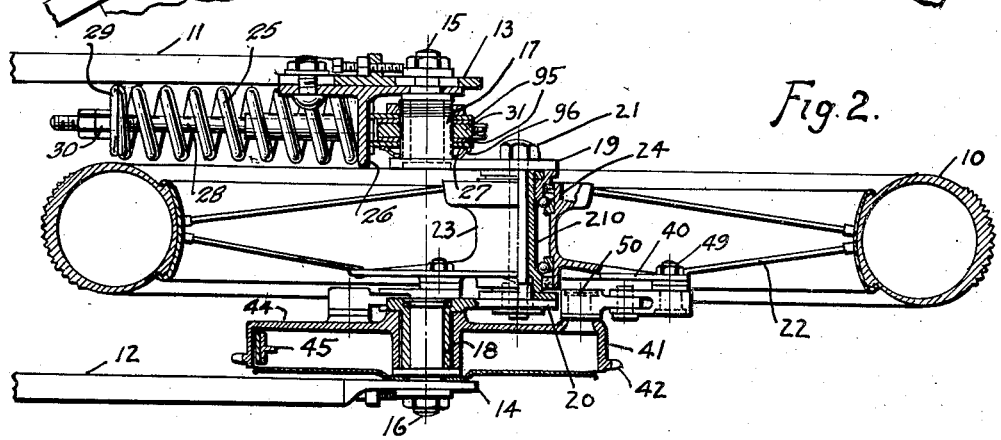

The application of shock absorbing means to my new wheel and spring suspension may be accomplished as shown in Fig. 2 with the application of friction means 95 between collars opposite the web of sprocket 31, the friction means being squeezed by a spring 96. In Fig. 4 I have indicated merely diagrammatically a housing 97 for a hydraulic shock absorber to be actuated by and constitute a control for the main shaft 73.

Figure 3:
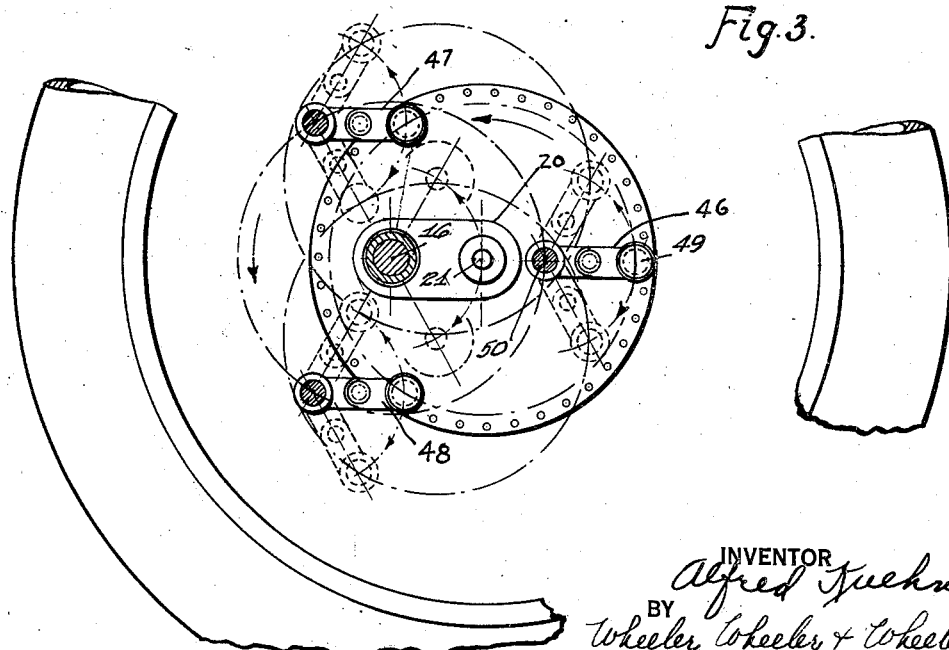
Figure 3 is a side elevation of the articulated driving connections and showing in dotted lines the development of movement of the parts in intermediate and maximum positions of oscillation during the springing movement of the parts.

From the above description it will be seen that as the weight upon the studs 15—16 forces them downwardly in spring controlled oscillation about the wheel axle 21, the application of power to the sprocket 42 causes the rotation of the wheel 10 to which the power is transmitted by means of the articulated driving connections which, although "swinging" in the same plane as shown clearly in Figure 2 do not pass one another as shown clearly in Figure 3 and may oscillate as shown in dotted lines in Figure 3 during the course of their movement.

I claim:

1. In a motorcycle wheel suspension, a forked frame member, a crank-shaped axle across the arms of the fork and provided with a sprocket integral with the crank, a wheel mounted upon the crank for eccentric movement with respect to the axis of the crank mounting in the frame, a chain about said sprocket and provided with chain ends reciprocable in accord with oscillations of the sprocket, a spring saddle upon the frame, a compression spring mounted on said saddle and connected with one of the chain ends whereby to compress the spring in the oscillation of the sprocket.

2. In a motorcycle wheel suspension, a forked frame member, a crank-shaped axle across the arms of the fork and provided with a sprocket integral with the crank, a wheel mounted upon the crank for eccentric movement with respect to the axis of the crank mounting in the frame, a chain about said sprocket and provided with chain ends reciprocable in accord with oscillations of the sprocket, a spring saddle upon the frame, a compression spring mounted on said saddle and connected with one of the chain ends whereby to compress the spring in the oscillation of the sprocket, a driving member mounted for rotation upon the axis of the frame, a driven member for rotation with the axle and linkage between said members whereby to provide power connection between the said members despite eccentric oscillations of the wheel under control of said spring.

ALFRED KUEHN.